United States Patent Office 2,920,261
Patented Jan. 5, 1960

2,920,261

CONTROL SYSTEMS FOR GENERATORS

Herman J. Braun and George H. Stearley, Lima, Ohio, assignors to Westinghouse Electric Corporation, East Pittsburgh, Pa., a corporation of Pennsylvania Application December 30, 1954, Serial No. 478,606

10 Claims. (Cl. 322—25)

This invention relates to electrical control systems and, more particularly, to a regulator for maintaining under fault conditions a constant input excitation to a three-phase generator no matter which phase of the system supplied thereby has a line-to-ground fault thereon.

Conventional magnetic amplifier type voltage regulators utilize single-phase voltages in their internal circuitry, even though the system under control is polyphase. These single-phase voltages are normally distributed over all of the phases of the polyphase power transformers so as to balance transformer loading. Therefore, during a single line-to-ground fault on a system, at least one of the single-phase voltages will decrease to substantially zero magnitude. As each successive phase is faulted, the net effect inside the regulator is different. Thus, the end result is that different magnitudes of current are supplied by the regulator to the field winding of the direct-current exciter supplying energy to its associated alternating-current generator. Therefore, different magnitudes of current flow from the alternating-current generator, as line-to-ground faults are applied to successive phases.

The above-mentioned prior art regulator systems have several disadvantages. For instance, the relative magnitudes of available fault current from one or two phases may be too small to cause fault clearance by means of protective devices such as fuses. Further, the inequality of fault currents makes proper coordination of these protective devices almost impossible for a polyphase system.

An object of this invention is to provide under fault conditions for maintaining a substantially constant input excitation to a generator supplying energy to a three-phase system irrespective of which system phase has a line-to-ground fault thereon.

Another object of this invention is to provide under fault conditions for maintaining a substantially constant output current from a regulator controlling the voltage across a three-phase system no matter which phase of the system is faulted, so that fault current of sufficient magnitude will always be supplied to effect an operation of a circuit interrupter to thereby clear the fault.

A further object of this invention is to provide for supplying under fault conditions a substantially constant input excitation to a generator supplying energy to a three-phase system no matter which phase of the system is faulted, so that circuit interrupters of substantial equal rating can be utilized in each of the phases for clearing the fault.

A more specific object of this invention is to provide under fault conditions for maintaining a substantially constant input excitation to a generator supplying energy to a three-phase system irrespective of which system phase has a line-to-ground fault thereon, by providing internal voltages within a regulator associated with the generator that are a measure of the voltage across two phases of the primary winding of a three-phase potential transformer responsive to the output voltage of the generator.

Other objects of this invention will become apparent from the following description when taken in conjunction with the accompanying drawings in which.

Figure 1:
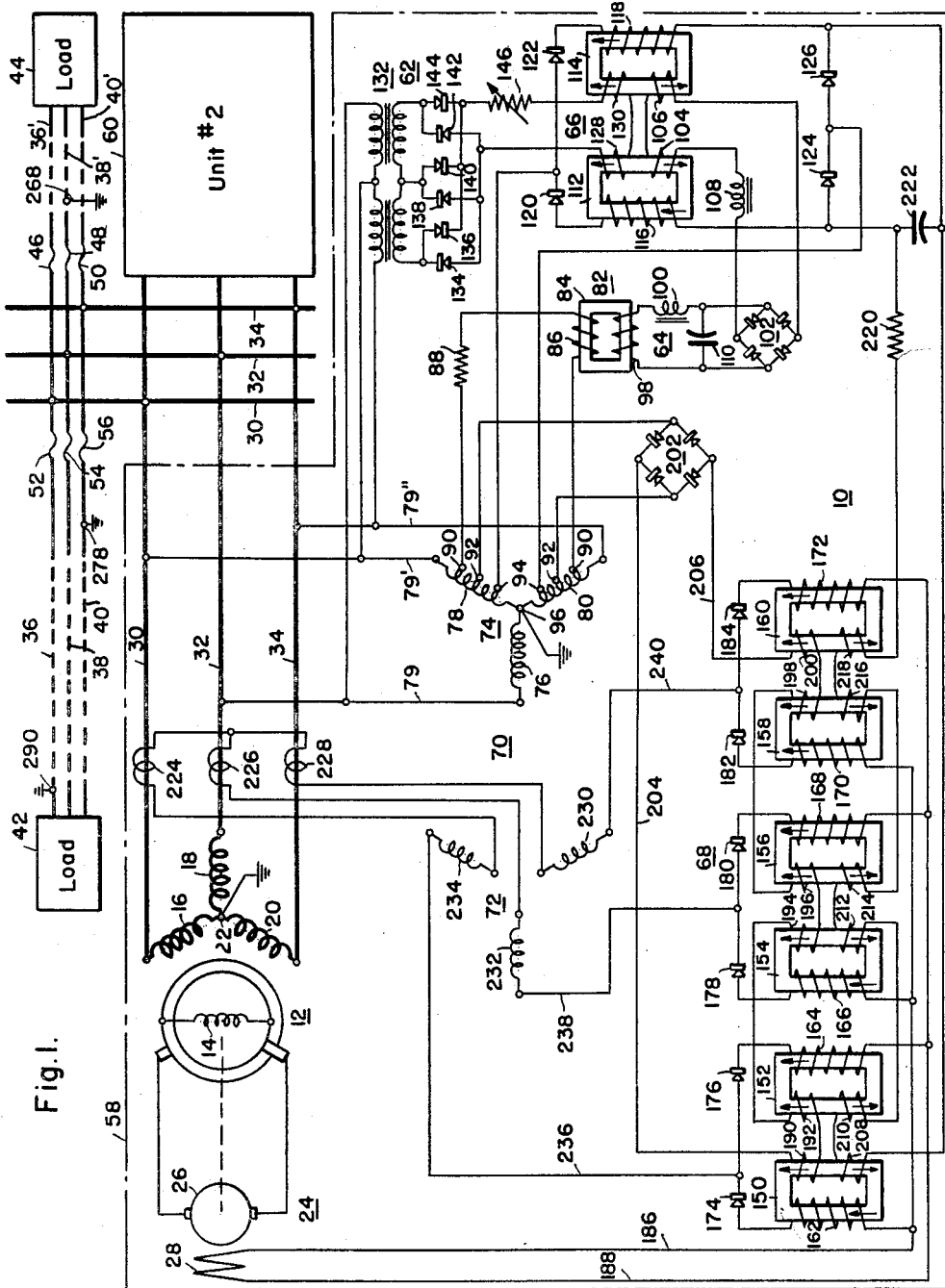
Figure 1 is a schematic diagram of apparatus and circuits illustrating this invention.

Referring to Fig. 1 there is illustrated a control system 10 for maintaining under fault conditions a substantially constant input excitation to a three-phase alternating-current generator 12 irrespective of which phase of the three-phase system supplied is faulted to ground. As illustrated, the alternating-current generator 12 comprises a rotatable field winding 14, and armature windings 16, 18 and 20 whose neutral point 22 in the example illustrated is connected to ground. In this instance, the magnitude of the voltage applied to the field winding 14 of the alternating-current generator 12 is controlled in accordance with the output of a direct-current exciter 24 having an armature 26 and a field winding 28.

In operation, the alternating-current generator 12 supplies energy to bus conductors 30, 32 and 34. A three-phase system comprising line conductors 36, 38 and 40, and line conductors 36', 38' and 40', are connected to the bus conductors 30, 32 and 34 to effect a supply of energy to loads 42 and 44 which may or may not be located a remote distance from the alternating-current generator 12. As illustrated, circuit interrupters, specifically fuses 46, 48 and 50 are disposed in circuit relationship with the line conductors 36', 38' and 40' in order to clear a line-to-ground fault that may occur on their respective phases. On the other hand, circuit interrupters, specifically fuses 52, 54 and 56 are disposed in circuit relationship with the line conductors 36, 38 and 40.

The control system 10, the alternating-current generator 12, and the direct-current exciter 24 comprise a power supply system 58 for furnishing energy to the loads 42 and 44. Another power supply system 60, identical to the power supply system 58, may be connected in parallel circuit relationship with the alternating-current generator 12, and also functions to supply energy to the loads 42 and 44. However, it is to be understood that this invention is not limited to parallel generator operation.

The control system 10, in general, comprises a three-phase sensing network 62 responsive to the output voltage of the alternating-current generator 12, a voltage reference network 64 disposed to produce at its output a voltage which remains substantially constant over a wide range of variation in the magnitude and frequency of its input voltage, a first-stage magnetic amplifier 66 responsive to the current outputs of the sensing network 62 and the voltage reference network 64 and so constructed that the current outputs of the networks 62 and 64 produce opposing magnetomotive forces in the magnetic amplifier 66 which have a predetermined difference when the output voltage of the alternating-current generator 12 is at its regulated value, a second-stage three-phase magnetic amplifier 68 responsive to the output of the first-stage magnetic amplifier 66 and connected to control the magnitude of the voltage across the field winding 28 of the direct-current exciter 24, and a three-phase potential transformer 70 having a three-phase secondary winding 72, which has disposed in inductive relationship therewith a three-phase primary winding 74 having phase windings 76, 78 and 80. In operation, the three-phase primary winding 74 of the transformer 70 is rendered responsive to the output voltage of the alternating-current generator 12 by means of conductors 79, 79' and 79" which are electrically connected to the bus conductors 32, 30 and 34, respectively, and in accordance with the teachings of this invention, as will be explained more fully hereinafter, the supply voltage applied to the first-stage magnetic amplifier 66 is proportional to a measure of the voltage across the two phase windings 78 and 80 of the primary winding 74. Also, in accordance with the teachings of this invention, the voltage applied to the input of the voltage reference network 64 is proportional to a measure of the voltage appearing across the two phase windings 78 and 80 of the primary winding 74. Further, as will be explained more fully hereinafter, the bias voltage applied to the second-stage magnetic amplifier 68 is also proportional to a measure of the voltage appearing across the two phase windings 78 and 80.

Referring more particularly to the voltage reference network 64, it comprises a saturating transformer 82 having a magnetic core member 84, preferably constructed from rectangular looped core material. In order to magnetically saturate the core member 84, in accordance with the measure of the voltage across the two phase windings 78 and 80 of the primary winding 74 of the transformer 70, a primary winding 86 is disposed in inductive relationship with the core member 84. In operation, the voltage applied to the primary winding 86 is always of sufficient magnitude to effect a substantially complete magnetic saturation of the magnetic core member 84.

When the voltage applied to the primary winding 86 of the saturating transformer 82 is of sufficient magnitude to effect a substantially complete magnetic saturation of the core member 84, the impedance of the primary winding 86 is extremely low. Therefore, a resistance member 88 is connected in series circuit relationship with the primary winding 86 in order to limit the magnitude of the current flow through the primary winding 86 and thus prevent excessive heating and resulting damage to the primary winding 86.

In accordance with the teachings of this invention the phase windings 78 and 80 of the primary winding 74 are provided with three sets of taps 90, 92 and 94. The three sets of taps 90, 92 and 94 are positioned symmetrically with respect to the junction point of the phase windings 78 and 80. In other words, the three sets of taps 90, 92 and 94 are positioned symmetrically with respect to the neutral 96 of the primary winding 74 of the transformer 70, which neutral is preferably grounded as illustrated. The series circuit including the resistance member 88 and the primary winding 86 of the saturating transformer 82 is rendered responsive to a measure of the voltage across the two phase windings 78 and 80 of the primary winding 74 by connecting the series circuit to the set of taps 90.

In order to produce an average output voltage from the saturating transformer 82, which is substantially independent of the magnitude of its input voltage, a secondary winding 98 is disposed in inductive relationship with the magnetic core member 84. The reason the average output voltage across the secondary winding 98 is substantially constant irrespective of the magnitude of the voltage applied to the primary winding 86 of the saturating transformer 82 is that the input voltage is always of sufficient magnitude as to effect a substantially complete magnetic saturation of the core member 84. This can be better understood by considering that it takes a predetermined number of volt-seconds to saturate the core member 84, and if the input voltage increases, the core member 84 will saturate within a predetermined time interval which will be of shorter duration than in the case when the input voltage is of lesser magnitude. Further, the areas under the voltage-time curves for the primary winding 86 are of substantially equal magnitude irrespective of the magnitude of the voltage applied to the primary winding 86, since the same predetermined volt-seconds are required to saturate the core member 84 each time. Therefore, since there is always a substantially complete saturation of the core member 84 for all magnitudes of voltage applied to the primary winding 86 above a predetermined value, the impedance of the secondary winding 98 and thus the average voltage thereacross remains substantially constant for varying magnitudes of voltage across the primary winding 86 of the saturating transformer 82. However, even though the average output voltage across the secondary winding 98 is substantially constant irrespective of the magnitude of the voltage applied to the primary winding 86 of the saturating transformer 82 still the magnitude of the average voltage across the secondary winding 98 does vary with changes in the frequency of the voltage applied to the primary winding 86.

For the purpose of integrating the output voltage of the saturating transformer 82 to thus maintain the output voltage of the voltage reference network 64 substantially constant over a wide range of variation in the frequency of the input voltage applied to the primary winding 86 of the saturating transformer 82 a linear iron core inductance member 100 is electrically connected between the secondary winding 98 and a full-wave dry-type rectifier 102 having input and output terminals. In particular, one end of the inductance member 100 is electrically connected to one end of the secondary winding 98, the other end of the inductance member 100 being electrically connected to one of the input terminals of the rectifier 102. The other input terminal of the rectifier 102 is electrically connected to the other end of the secondary winding 98.

In order for the inductance member 100 to function properly as an integrating device and thus have its impedance vary directly as the frequency of the voltage across the secondary winding 98 of the saturating transformer 82, the value of the reactive impedance of the inductance member 100 must be large as compared to the resistance value presented by the reference windings 104 and 106 of the first-stage magnetic amplifier 66 and by an inductance member 108. It is to be noted that although the reference network 64 maintains the voltage across the reference windings 104 and 106 of the magnetic amplifier 66 substantially constant over a wide range in the magnitude and frequency of the voltage applied to the primary winding 86 of the saturating transformer 82, it also has a large power output for a given power input, this feature being obtained by providing the integrating means or inductance member 100 which has an extremely low power loss. Thus, as is desired, substantially all the power output from the saturating transformer 82 is supplied to the reference windings 104 and 106 of the magnetic amplifier 66. In order to assure that the voltage reference network 64 will present a high impedance to the magnetic amplifier 66, the linear iron core inductance member 108 is provided. In this instance, the inductance member 108 is connected in series circuit relationship with the reference windings 104 and 106 of the magnetic amplifier 66, this series circuit being so electrically connected across the output terminals of the rectifier 102 that the reference windings 104 and 106 are responsive to the output current of the voltage reference network 64.

The inductance member 108 also presents a low impedance, as seen from the input side of the rectifier 102. This condition meets the requirement that the load be of low impedance as compared to the inductance member 100, in order for the inductance member 100 to function properly as an integrating means. Not only does the inductance member 108 provide the desired impedance, but it likewise functions to filter the rectified output current from the rectifier 102.

The insertion of the inductance member 108 tends to decrease the accuracy of the voltage reference 64, therefore, in order to obtain a constant output voltage for the reference network 64, a capacitor 110 is electrically connected in circuit relationship with the input terminals of the rectifier 102. The capacitor 110 and the inductance member 100 do not form a resonant circuit.

The magnetic amplifier 66 is of the self-saturating type and comprises rectangular shaped magnetic core members 112 and 114 which have disposed in inductive relationship therewith load windings 116 and 118, respectively. Self-saturation for the magnetic amplifier 66 is obtained by connecting in series circuit relationship with the load windings 116 and 118 self-saturating rectifiers 120 and 122, respectively, so that current flows in only one direction through the load windings 116 and 118. Load rectifiers 124 and 126 are also connected in circuit relationship with the load windings 116 and 118, respectively, in order to provide a direct-current output for the magnetic amplifier 66. In operation, the direct-current output of the magnetic amplifier 66 varies in accordance with the magnitude of the output voltage of the alternating-current generator 12. Specifically, control windings 128 and 130 are disposed in inductive relationship with the magnetic core members 112 and 114, respectively, the control windings 128 and 130 being responsive to the output of the sensing network 62 which in turn is responsive to the output voltage of the generator 12.

In operation, the output current of the sensing network 62 which flows through the control windings 128 and 130 of the magnetic amplifier 66 produces magnetomotive forces with respect to the core members 112 and 114, respectively, which are of greater magnitude than the magnetomotive forces produced with respect to these core members by the output current of the voltage reference network 64 which flows through the reference windings 104 and 106 of the magnetic amplifier 66. Also in operation, the magnetomotive forces produced by the current flow through the control windings 128 and 130 of the magnetic amplifier 66 oppose the magnetomotive forces produced by the current flow through the respective load windings 116 and 118. On the other hand, the magnetomotive forces produced by the current flow through the reference windings 104 and 106 of the magnetic amplifier 66 aid the magnetomotive forces produced by the current flow through the respective load windings 116 and 118.

In accordance with the teachings of this invention a supply voltage is applied to the magnetic amplifier 66 which varies in accordance with the measure of the voltage across the two phase windings 78 and 80 of the transformer 70. Specifically, the junction point of the load rectifiers 124 and 126 is connected to one of the taps of the set of taps 94, and the junction point of the self-saturating rectifiers 120 and 122 is connected to the other tap of the set of taps 94. The manner in which such a connection affects the operation of the control system to produce the desired result will be explained hereinafter.

Referring to the sensing network 62 it comprises a potential transformer 132 which is responsive to the output voltage of the alternating-current generator 12. In order to rectify the output voltage of the potential transformer 132 rectifiers 134, 136, 138, 140, 142 and 144 are provided. The control windings 128 and 130 of the magnetic amplifier 66 are responsive to the rectified output current of the rectifiers 134, 136, 138, 140, 142 and 144. In particular, the control windings 128 and 130 are connected in series circuit relationship with a variable resistor 146, one end of the series circuit being connected to the junction point of the rectifiers 136, 140 and 144, the other end of the series circuit being connected to the junction point of the rectifiers 134, 138 and 142. The function of the variable resistor 146 is to vary the magnitude of the current flow through the control windings 128 and 130 of the magnetic amplifier 66 so that the desired preset value of current flow therethrough can be obtained.

As hereinbefore mentioned, the three-phase magnetic amplifier 68 is responsive to the output of the magnetic amplifier 66. As illustrated, the three-phase magnetic amplifier 68 comprises magnetic core members 150, 152, 154, 156, 158 and 160, which have disposed in inductive relationship therewith load windings 162, 164, 166, 168, 170 and 172, respectively, the load windings 162, 164, 166, 168, 170 and 172 receiving energy from the alternating-current generator 12. In order to produce self-saturation for the magnetic amplifier 68, the load windings 162, 164, 166, 168, 170 and 172 have connected in series circuit relationship therewith self-saturating rectifiers 174, 176, 178, 180, 182 and 184, respectively. As illustrated, the load windings 162, 166 and 170 are so connected to a conductor 186 and the load windings 164, 168 and 172 are so connected to a conductor 188 that the output current of the magnetic amplifier 68 flows in only one direction through the field winding 28 of the direct current exciter 24.

In order to bias the magnetic core members 150, 152, 154, 156, 158 and 160 a predetermined amount, these magnetic core members have disposed in inductive relationship therewith bias windings 190, 192, 194, 196, 198 and 200, respectively. As illustrated, the bias windings 190, 192, 194, 196, 198 and 200 are connected in series circuit relationship with one another across the output terminals of a full-wave dry-type rectifier 202 by means of conductors 204 and 206.

In accordance with the teachings of this invention, the bias windings 190, 192, 194, 196, 198 and 200 of the three-phase magnetic amplifier 68 are rendered responsive to a measure of the voltage appearing across the two phase windings 78 and 80 of the transformer 70. In particular, the set of taps 92 is connected to the input terminals of the rectifier 202.

For the purpose of controlling the flux level in the magnetic core members 150, 152, 154, 156, 158 and 160 in accordance with the output current of the magnetic amplifier 66 and thus in accordance with the magnitude of the output voltage of the generator 12, control windings 208, 210, 212, 214, 216 and 218 are disposed in inductive relationship with the magnetic core members 150, 152, 154, 156, 158 and 160, respectively. In this instance, the control windings 208, 210, 212, 214, 216 and 218 are connected in series circuit relationship with a resistor 220, one end of this series circuit being electrically connected to the junction point of the load winding 116 and the load rectifier 124 of the magnetic amplifier 66, and the other end of the series circuit being electrically connected to the junction point of the load winding 118 and the load rectifier 126 of the magnetic amplifier 66. Also connected to the junction point of the load winding 116 and the load rectifier 124 and to the junction point of the load winding 118 and the load rectifier 126 is a capacitor 222 which in combination with the resistor 220 constitutes a filter, having a minimum of delay, and which functions to decouple the inductance of the magnetic amplifier 66 from the inductance of the magnetic amplifier 68.

In operation, the current flow through the bias windings 190, 192, 194, 196, 198 and 200 produces magnetomotive forces that oppose the magnetomotive forces produced by the current flow through the associated load windings 162, 164, 166, 170 and 172, respectively. On the other hand, the current flow through the control windings 208, 210, 212, 214, 216 and 218 of the magnetic amplifier 68 produces magnetomotive forces which aid the magnetomotive forces produced by the current flow through the associated load windings 162, 164, 166, 168, 170 and 172, respectively. Also in operation, the control windings 208, 210, 212, 214, 216 and 218 of the magnetic amplifier 68 are responsive to the current flow through the load windings 116 and 118 of the magnetic amplifier 66.

Current transformers 224, 226 and 228 are disposed to be responsive to the current flow through the bus conductors 30, 32 and 34 respectively. By providing the current transformers 224, 226 and 228 and the three-phase potential transformer 70 and by properly interconnecting them with the three-phase magnetic amplifier 68, certain advantages are obtained. For insance, if a three-phase short should occur so as to reduce the voltage across the bus conductors 30, 32 and 34 to zero magnitude, the current transformers 224, 226 and 228 still would continue to supply voltage to the load windings 162, 164, 166, 168, 170 and 172 of the three-phase magnetic amplifier 68, provided the three-phase short circuit occurs beyond the current transformers 224, 226 and 228 in the direction of the loads 42 and 44, to thus provide field excitation for the alternating-current generator 12 even though a three-phase short has occurred. Therefore, by providing such equipment a shutdown of the alternating-current generator 12 is prevented.

The three-phase secondary winding 72, of the transformer 70, which comprises phase windings 230, 232 and 234 is connected to the load windings 162, 164, 166, 168, 170 and 172 of the three-phase magnetic amplifier 68 by means of conductors 236, 238 and 240, and by means of the self-saturating rectifiers 174, 176, 178, 180, 182 and 184. However, the manner in which the load windings 162, 164, 166, 168, 170 and 172 of the three-phase magnetic amplifier 68 receive energy from the potential transformer 70, which includes the phase windings 230, 232 and 234, and from the current transformer 224, 226 and 228 can be better understood by tracing the current flow through these load windings during various phases of the output voltage of the potential transformer 70. Assuming the lower end of the phase winding 234, as illustrated, is at positive polarity with respect to the upper end of the phase winding 234, then current flows from this lower end through the current transformer 224, the current transformer 226, the phase winding 232, the conductor 238, the self-saturating rectifier 180 of the magnetic amplifier 68, the load winding 168, the conductor 188, the field winding 28 of the exciter 24, the conductor 186, the load winding 162 of the magnetic amplifier 68, the self-saturating rectifier 174, and the conductor 236, to the upper end of the phase winding 234 of the potential transformer 70. When the lower end of the phase winding 234, as illustrated, is at a positive polarity with respect to the upper end of the phase winding 234, current also flows from the lower end of the phase winding 234 through the current transformer 224, the current transformer 228, the phase winding 230, the conductor 240, the self-saturating rectifier 184 of the magnetic amplifier 68, the load winding 172, the conductor 188, the field winding 28 of the exciter 24, the conductor 186, the load winding 162 of the magnetic amplifier 68, the self-saturating rectifier 174, and the conductor 236, to the upper end of the phase winding 234 of the secondary winding 72 of the transformer 70.

During the next phase of the output voltage of the potential transformer 70 in which the right end of the phase winding 232, as illustrated, is at a positive polarity with respect to its left end, current flows from this right end through the current transformer 226, the current transformer 228, the phase winding 230 of the secondary winding 72, the conductor 240, the self-saturating rectifier 184 of the magnetic amplifier 68, the load winding 172, the conductor 188, the field winding 28 of the exciter 24, the conductor 186, the load winding 166 of the magnetic amplifier 68, the self-saturating rectifier 178, and the conductor 238, to the left end of the phase winding 232. When the right end of the phase winding 232, as illustrated, is at a positive polarity with respect to its left end, current also flows from this right end through the current transformer 226, the current transformer 224, the phase winding 234 of the secondary winding 72, the conductor 236, the self-saturating rectifier 176 of the magnetic amplifier 68, the load winding 164, the conductor 188, the field winding 28 of the exciter 24, the conductor 186, the load winding 166 of the magnetic amplifier 68, the self-saturating rectifier 178, and the conductor 238, to the left end of the phase winding 232 of the potential transformer 70.

During the next phase of the output voltage of the potential transformer 70 in which the upper end of the phase winding 230, as illustrated, is at a positive polarity with respect to its lower end, current flows from the upper end of the phase winding 230 through the current transformer 228, the current transformer 226, the phase winding 232 of the potential transformer 70, the conductor 238, the self-saturating rectifier 180 of the magnetic amplifier 68, the load winding 168, the conductor 188, the field winding 28 of the exciter 24, the conductor 186, the load winding 170 of the magnetic amplifier 68, the self-saturating rectifier 182, and the conductor 240, to the lower end of the phase winding 230. When the upper end of the phase winding 230, as illustrated, is at a positive polarity with respect to its lower end, current also flows from the upper end of the phase winding 230 through the current transformer 228, the current transformer 224, the phase winding 234 of the potential transformer 70, the conductor 236, the self-saturating rectifier 176 of the magnetic amplifier 68, the load winding 164, the conductor 188, the field winding 28 of the exciter 24, the conductor 186, the load winding 170 of the magnetic amplifier 68, the self-saturating rectifier 182, and the conductor 240, to the lower end of the phase winding 230 of the potential transformer 70.

Figure 2:
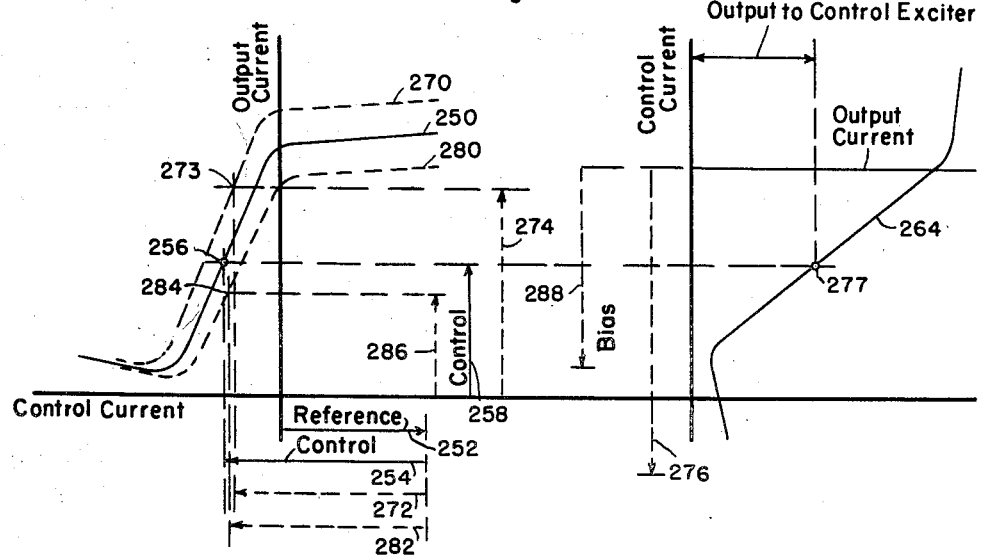
Fig. 2 is a graph illustrating the manner in which the apparatus embodying the teachings of this invention functions to produce the desired result.

The operation of the apparatus embodying the teachings of this invention can be better understood by referring to Fig. 2. In Fig. 2 a curve 250 represents the transfer curve for the first-stage magnetic amplifier 66 when the system illustrated in Fig. 1 is operating under normal conditions and there is no line-to-ground faults in existence. When no line-to-ground faults are in existence the effect of the current flow through the reference windings 104 and 106 of the magnetic amplifier 66 is represented by a vector 252. Under such assumed conditions the effect of the current flow through the control windings 128 and 130 of the magnetic amplifier 66 is represented by a vector 254. Thus, under such assumed conditions the magnetic amplifier 66 is operating at a point 256 on the transfer curve 250, to thus produce an output current from the magnetic amplifier 66 as represented by a vector 258.

A curve 264 represents the transfer curve for the magnetic amplifier 68 for a certain temperature, load and fault impedance, and for a certain generator speed. Now let us assume that a line-to-ground fault occurs at a point 268. When such a line-to-ground fault occurs, the magnitude of the voltage across the phase winding 76 of the potential transformer 70 decreases to substantially zero, however, the magnitude of the voltage appearing across the phase windings 78 and 80 increases. An increase in the magnitude of the voltage appearing across the phase windings 78 and 80 increases the magnitude of the supply voltage applied to the first-stage magnetic amplifier 66. Such being the case, the transfer curve 250 of the magnetic amplifier 66 is shifted upwards to a position as represented by a transfer curve 270.

When a line-to-ground fault occurs at the point 268, the magnitude of the voltage applied to the input of the voltage reference network 64 increases, however, owing to its characteristics the magnitude of the current flow through the reference windings 104 and 106 of the magnetic amplifier 66 remains substantially constant. However, when the magnitude of the voltage across the phase winding 76 of the potential transformer 70 decreases to substantially zero the magnitude of the current flow through the control windings 128 and 130 of the magnetic amplifier 66 decrease. The effect produced by the new lower value of control current flowing through the control windings 128 and 130 is represented by a vector 272. Since the transfer curve 250 has been shifted upwards to a position as represented by the transfer curve 270 and since the magnitude of the control current through the control windings 128 and 130 of the magnetic amplifier 66 has decreased, a new operating point is obtained as represented at 273. This effects an increase in the output current of the magnetic amplifier 66 to a value as represented by a vector 274. However, since the magnitude of the voltage appearing across the phase windings 78 and 80 of the potential transformer 70 increased, the magnitude of the current flow through the bias windings 190, 192, 194, 196, 198 and 200 of the magnetic amplifier 68 likewise increased, to thereby produce an effect as represented by a vector 276. As can be seen from Fig. 2, the net effect of the vectors 274 and 276 is to effect an operation of the magnetic amplifier 68 at the operating point 277. Thus, the output current of the second-stage magnetic amplifier 68 effects a sufficient flow of fault current through the fuse 48 to blow this fuse and thus clear the fault at the point 268.

Assuming a line-to-ground fault occurs at a point 278, then the voltage across the phase winding 80 of the potential transformer 70 decreases to substantially zero. Such an action decreases the magnitude of the voltage appearing across the two phases 78 and 80 of the potential transformer 70. A decrease in the magnitude of the voltage appearing across the two phases 78 and 80 decreases the magnitude of the supply voltage applied to the first-stage magnetic amplifier 66. A decrease in the magnitude of the supply voltage applied to the magnetic amplifier 66 effects a shifting of the transfer curve 250 downward to a position as represented by a transfer curve 280. Since the voltage reference network 64 is such as to maintain a substantially constant output voltage, the magnitude of the current flow through the reference windings 104 and 106 of the magnetic amplifier 66 remains substantially unchanged even though the magnitude of the voltage appearing across the phase windings 78 and 80 of the potential transformer 70 decreases due to a fault appearing at the point 278. However, the magnitude of the current flow through the control windings 128 and 130 of the magnetic amplifier 66 does decrease when a fault appears at the point 278. Such being the case, the new value of control current flowing through the control windings 128 and 130 is represented by a vector 282. Thus, when a line-to-ground fault occurs at the point 278 a new operating point is established for the magnetic amplifier 66 as represented by a point 284. Therefore, the output current from the magnetic amplifier 66 is represented by a vector 286 which is of lesser magnitude than the vector 258 which represents the output current of the magnetic amplifier 66 when no line-to-ground faults are in existence. However, when a fault exists at the point 278 the magnitude of the current flow through the bias windings 190, 192, 194, 196, 198 and 200 of the magnetic amplifier 68 likewise decreases, as is represented by a vector 288. The net effect of the vectors 286 and 288 is to again effect an operation of the magnetic amplifier 68 at the operating point 277. Since the output current from the magnetic amplifier 68 remains substantially unchanged from the case when the fault occurred at the point 268, there is sufficient fault current flowing through the fuse 56 to effect an interruption of the circuit and thus a clearing of the fault occurring at the point 278.

If a line-to-ground fault occurs at a point 290, the magnitude of the voltage appearing across the phase winding 78 of the potential transformer 70 decreases to substantially zero. This in turn decreases the magnitude of the voltage appearing across the phase windings 78 and 80 of the potential transformer 70. A decrease in the magnitude of the voltage across the phase windings 78 and 80 decreases the magnitude of the supply voltage applied to the magnetic amplifier 66 and likewise decreases the magnitude of the bias voltage applied to the bias windings 190, 192, 194, 196, 198 and 200 of the magnetic amplifier 68. Such an action produces the same effect as described above with reference to a fault occurring at the point 278 and therefore a further description of such an operation is deemed unnecessary. Thus, the fault current through the fuse 52 when a fault occurs at the point 290 is of sufficient magnitude to interrupt the circuit and clear the fault at the point 290.

From the foregoing it can be realized that no matter where a line-to-ground fault occurs such as at the point 268, the point 278, or the point 290, the control system 10 maintains under fault conditions a substantially constant input excitation to the alternating-current generator 12. Therefore, sufficient fault current flows through the various circuits to clear the particular fault. Further, since under line-to-ground fault conditions a substantially constant input excitation is maintained to the generator 12, the fuses 46, 48, 50, 52, 54 and 56 can be of the same rating, thus making it extremely easy to coordinate the protective devices such as the fuses shown in Fig. 1. In other words, it is not necessary to provide a fuse of different rating in each of the various line conductors 36, 38 and 40, and in each of the line conductors 36', 38' and 40'.

The operation of the control system 10 in maintaining the output voltage of the alternating-current generator 12 substantially constant when a change in the magnitude of the loads 42 and 44 occurs will now be briefly described. Assuming there is an increase in the output voltage of the generator 12 above its regulated value, then the output current of the sensing network 62 increases to thereby increase the magnitude of the current flow through the control windings 128 and 130 of the magnetic amplifier 66. The increased current flow through the control windings 128 and 130 increases the magnetomotive forces produced thereby with respect to the magnetic core members 112 and 114, respectively, which magnetomotive forces oppose the magnetomotive forces produced with respect to the magnetic core members 112 and 114 by the current flow through the load windings 116 and 118, respectively, to thereby decrease the output current of the magnetic amplifier 66. With a decrease in the output current of the magnetic amplifier 66, the output current of the magnetic amplifier 68 also decreases to thereby decrease the magnitude of the current flow through the field winding 28 of the exciter 24. This latter action decreases the voltage across the field winding 14 of the generator 12, to thereby return the output voltage of the generator 12 to its regulated value.

On the other hand, assuming the output voltage of the alternating-current generator 12 decreases to a value below its regulated value, then the output current of the sensing network 62 also decreases to thereby decrease the magnitude of the current flow through the control windings 128 and 130 of the magnetic amplifier 66. A decrease in the magnitude of the current flow through the control windings 128 and 130 increases the magnitude of the output current of the magnetic amplifier 66. With an increase in the output current of the magnetic amplifier 66 the output current of the magnetic amplifier 68 is increased, to thereby increase the magnitude of the current flow through the field winding 28 of the exciter 24, to thereby return the output voltage of the generator 12 to its regulated value.

Figure 3:
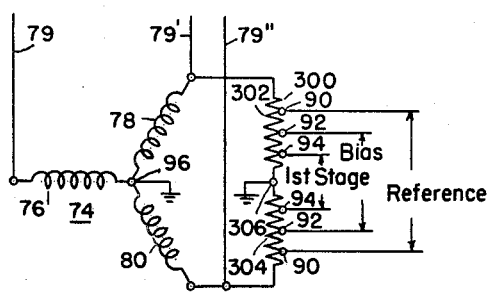
Fig. 3 is a schematic diagram of another embodiment of this invention.

Referring to Fig. 3, there is illustrated an alternative means for obtaining a measure of the voltage across the phase windings 78 and 80 of the potential transformer 70. In order to simplify the description, like components of Figs. 1 and 3 have been given the same reference characters. The greater portion of the circuit shown in Fig. 1 has not been shown in Fig. 3, however, it is to be understood that it is identical to that shown in Fig. 1. As illustrated, a resistance member 300 is connected across the two phase windings 78 and 80. In this instance, the resistance member 300 comprises two separate resistors 302 and 304, however, it is to be understood that the resistance member could comprise a single resistor.

The midpoint 306 of the resistance member 300 is preferably grounded as shown in Fig. 3 and the three sets of taps 90, 92 and 94 are positioned symmetrically with respect to the midpoint 306 of the resistance member 300. It is to be understood that the three sets of taps 90, 92 and 94 are connected to the various components in the same manner as illustrated in Fig. 1.

It is to be understood that although a specific voltage reference network 64 has been shown in Fig. 1 of the drawings, any suitable voltage reference device (not shown) could be substituted therefor.

Since numerous changes may be made in the above-described apparatus and circuits, and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a regulator system which controls the output of a three-phase generator supplying energy to a three-phase system, said regulator system comprising means for protecting the three-phase system should a fault occur thereon, the combination comprising, a transformer having a three-phase primary and secondary winding, the primary winding being responsive to the output of the three-phase generator, a first magnetic amplifier, means for controlling the output of a first magnetic amplifier in accordance with the output of the three-phase generator, circuit means interconnected between said first magnetic amplifier and the primary winding of the three-phase transformer for applying to said first magnetic amplifier a supply voltage which is a measure of the voltage across two of the three phases of the primary winding of the transformer, a second magnetic amplifier having a control winding, means for rendering said control winding responsive to a measure of the voltage across said two of the three phases of the primary winding of the transformer, means for interconnecting the three-phase secondary winding with said second magnetic amplifier so as to apply a supply voltage to said second magnetic amplifier, said second magnetic amplifier being responsive to the output of said first magnetic amplifier to control the output of said three-phase generator under normal operating conditions and being responsive to the voltage across two of the phases of the primary winding of said transformer to control the output of said generator should a fault occur on said system.

2. In a regulator system which controls the output of a three-phase generator supplying energy to a three-phase system, said regulator system comprising means for protecting the three-phase system should a fault occur thereon, the combination comprising, a potential transformer having a three-phase primary and secondary winding, the three-phase primary winding being responsive to the output of the three-phase generator, a first magnetic amplifier including magnetic core means and a load winding, a control winding and a reference winding disposed in inductive relationship with the magnetic core means, said control winding being responsive to the output of the three-phase generator, circuit means for applying across the load winding a measure of the voltage across two of the three phases of the primary winding, other circuit means for applying across the reference winding a measure of the voltage across said two of the three phases of the primary winding, a second magnetic amplifier including a bias winding, means for rendering said bias winding responsive to a measure of the voltage across the said two of the three phases of the three-phase primary winding, means for interconnecting the three-phase secondary winding of the transformer with said second magnetic amplifier so as to apply a supply voltage to the said second magnetic amplifier, said second magnetic amplifier being responsive to the output of said first magnetic amplifier to control the output of said three-phase generator under normal operating conditions and being responsive to the output across two of the phases of the primary winding of said transformer to control the output of said three-phase generator should a fault occur on said three-phase system.

3. In a regulator system which controls the output of a three-phase generator supplying energy to a three-phase system, said regulator system comprising means for protecting the three-phase system should a fault occur thereon, the combination comprising, a potential transformer having a three-phase primary winding and secondary winding, the three-phase primary winding being responsive to the output of the three-phase generator and having three sets of taps on two of its three phases, the three sets of taps being positioned symmetrically with respect to the junction point of said two of its three phases, a first magnetic amplifier including magnetic core means and a load winding, a control winding and a reference winding disposed in inductive relationship with the magnetic core means, said control winding being responsive to the output of the three-phase generator, circuit means for interconnecting the load winding with one of the three sets of taps, other circuit means for interconnecting the reference winding with another set of the three sets of taps, a second magnetic amplifier including a bias winding, means for interconnecting the bias winding with the remaining set of the three sets of taps, means for interconnecting the three-phase secondary winding of the transformer with said second magnetic amplifier so as to apply a supply voltage to the said second magnetic amplifier, said second magnetic amplifier being responsive to the output of said three-phase generator under normal operating conditions and being responsive to the output across two of the phases of the primary winding of said transformer to control the output of said three-phase generator should a fault occur on said three-phase system.

4. In a regulator system which controls the output of a three-phase generator supplying energy to a three-phase system, said regulator system comprising means for protecting the three-phase system should a fault occur thereon, the combination comprising, a potential transformer having a three-phase primary winding and secondary winding, the three-phase primary winding being responsive to the output of the three-phase generator and having three sets of taps on two of its three phases, the three sets of taps being positioned symmetrically with respect to the junction point of said two of its three phases, a first self-saturating magnetic amplifier including magnetic core means and a load winding, a control winding and a reference winding disposed in inductive relationship with the magnetic core means, said control winding being responsive to the output of the three-phase generator, circuit means for interconnecting the load winding with one of the three sets of taps so as to apply a supply voltage thereto, the current flow through the said control winding producing a magnetomotive force which opposes the magnetomotive force produced by the current flow through the load winding, other circuit means for interconnecting the reference winding with another set of the three sets of taps so as to apply a voltage to the reference winding, the current flow through the reference winding producing a magnetomotive force that aids the magnetomotive force produced by the current flow through the load winding, another magnetic amplifier including a magnetic core member and a load winding, a control winding and a bias winding disposed in inductive relationship with the magnetic core member, means for interconnecting the three-phase secondary winding of the potential transformer with the load winding of said another magnetic amplifier, means for interconnecting the bias winding with the remaining set of the three sets of taps so as to apply a bias voltage to the bias winding, means for rendering said control winding of the said another magnetic amplifier responsive to the current flow through said load winding of the first mentioned magnetic amplifier, the current flow through said bias winding producing a magnetomotive force that opposes the magnetomotive force produced by the current flow through said control winding of the said another magnetic amplifier, said another magnetic amplifier being responsive to the output of said first magnetic amplifier to control the output of said three-phase generator under normal operating conditions and being responsive to the output across two of the phases of the primary winding of said transformer to control the output of said three-phase generator should a fault occur on said three-phase system.

5. In a regulator system for maintaining the output voltage of a three-phase generator substantially constant while supplying energy to a three-phase system, said regulator system comprising means for protecting the three-phase system should a fault occur thereon, the combination comprising, a potential transformer having a three-phase primary winding and secondary winding, the three-phase primary winding being responsive to the output voltage of the three-phase generator and having three sets of taps on two of its three phases, the three sets of taps being positioned symmetrically with respect to the junction point of said two of its three phases, a self-saturating magnetic amplifier including magnetic core means and a load winding, a control winding and a reference winding disposed in inductive relationship with the magnetic core means, said control winding being responsive to the output voltage of the three-phase generator, circuit means for interconnecting the load winding with one of the three sets of taps so as to apply a supply voltage thereto, the current flow through the said control winding producing a magnetomotive force which opposes the magnetomotive force produced by the current flow through the load winding, a reference network for producing a substantially constant output voltage even though the magnitude of its input voltage varies, other circuit means for interconnecting the reference network with the reference winding and with another set of the three sets of taps so as to apply a substantially constant voltage to the reference winding, the current flow through the reference winding producing a magnetomotive force that aids the magnetomotive force produced by the current flow through the loading winding, a three-phase magnetic amplifier including a magnetic core member and a load winding, a control winding and a bias winding disposed in inductive relationship with the magnetic core member, means for interconnecting the three-phase secondary winding of the potential transformer with the load winding of the three-phase magnetic amplifier, means for interconnecting the bias winding with the remaining set of the three sets of taps so as to apply a bias voltage to the bias winding, means for rendering said control winding of the three-phase magnetic amplifier responsive to the current flow through said load winding of the first mentioned magnetic amplifier, the current flow through said bias winding producing a magnetomotive force that opposes the magnetomotive force produced by the current flow through said control winding of the three-phase magnetic amplifier, said three-phase magnetic amplifier being responsive to the output of said first-mentioned magnetic amplifier to control the output of said three-phase generator under normal operating conditions and being responsive to the voltage across two of the phases of the three-phase primary winding of the potential transformer to control the output of said generator should a fault occur on said three-phase system.

6. In a regulator system which controls the output of a three-phase generator supplying energy to a three-phase system, the combination comprising, a transformer having a three-phase primary winding and secondary winding, the three-phase primary winding being responsive to the output of the three-phase generator, a resistance member including three sets of taps, the resistance member being connected across two of the three phases of the three-phase primary winding and the three sets of taps being positioned symmetrically with respect to the midpoint of the resistance member, a magnetic amplifier including magnetic core means and a load winding, a control winding and a reference winding disposed in inductive relationship with the magnetic core means, said control winding being responsive to the output of the three-phase generator, circuit means for interconnecting the load winding with one of the three sets of taps, other circuit means for interconnecting the reference winding with another set of the three sets of taps, another magnetic amplifier including a bias winding, means for interconnecting the bias winding with the remaining set of the three sets of taps, means for interconnecting the three-phase secondary winding of the transformer with said another magnetic amplifier so as to apply a supply voltage to the said another magnetic amplifier, and means for rendering the said another magnetic amplifier responsive to the current flow through said load winding and for controlling the output of the three-phase generator in accordance with the output of the said another magnetic amplifier.

7. In a regulator system which controls the output of a three-phase generator supplying energy to a three-phase system, the combination comprising, a potential transformer having a three-phase primary winding and secondary winding, the three-phase primary winding being responsive to the output of the three-phase generator, a resistance member including three sets of taps, the resistance member being connected across two of the three phases of the three-phase primary winding and the three sets of taps being positioned symmetrically with respect to the midpoint of the resistance member, a self-saturating magnetic amplifier including magnetic core means and a load winding, a control winding and a reference winding disposed in inductive relationship with the magnetic core means, said control winding being responsive to the output of the three-phase generator, circuit means for interconnecting the load winding with one of the three sets of taps so as to apply a supply voltage thereto, the current flow through the said control winding producing a magnetomotive force which opposes the magnetomotive force produced by the current flow through the load winding, other circuit means for interconnecting the reference winding with another set of the three sets of taps so as to apply a voltage to the reference winding, the current flow through the reference winding producing a magnetomotive force that aids the magnetomotive force produced by the current flow through the load winding, another magnetic amplifier including a magnetic core member and a load winding, a control winding and a bias winding disposed in inductive relationship with the magnetic core member, means for interconnecting the three-phase secondary winding of the potential transformer with the load winding of said another magnetic amplifier, means for interconnecting the bias winding with the remaining set of the three sets of taps so as to apply a bias voltage to the bias winding, means for rendering said control winding of the said another magnetic amplifier responsive to the current flow through said load winding of the first mentioned magnetic amplifier, the current flow through said bias winding producing a magnetomotive force that opposes the magnetomotive force produced by the current flow through the said control winding of the said another magnetic amplifier, and means for controlling the output of the three-phase generator in accordance with the output of the said another magnetic amplifier.

8. In a regulator system for maintaining the output voltage of a three-phase generator substantially constant while supplying energy to a three-phase system, the combination comprising, a potential transformer having a three-phase primary winding and secondary winding, the three-phase primary winding being responsive to the output voltage of the three-phase generator, a resistance member including three sets of taps, the resistance member being connected across two of the three phases of the three-phase primary winding and the three sets of taps being positioned symmetrically with respect to the midpoint of the resistance member, a self-saturating magnetic amplifier including magnetic core means and a load winding, a control winding and a reference winding disposed in inductive relationship with the magnetic core means, said control winding being responsive to the output voltage of the three-phase generator, circuit means for interconnecting the load winding with one of the three sets of taps so as to apply a supply voltage thereto, the current flow through the said control winding producing a magnetomotive force which opposes the magnetomotive force produced by the current flow through the load winding, a reference network for producing a substantially constant output voltage even through the magnitude of its input voltage varies, other circuit means for interconnecting the reference network with the reference winding and with another set of the three sets of taps so as to apply a substantial constant voltage to the reference winding, the current flow through the reference winding producing a magnetomotive force that aids the magnetomotive force produced by the current flow through the load winding, a three-phase magnetic amplifier including a magnetic core member and a load winding, a control winding and a bias winding disposed in inductive relationship with the magnetic core member, means for interconnecting the three-phase secondary winding of the potential transformer with the load winding of the three-phase magnetic amplifier, means for interconnecting the bias winding with the remaining set of the three sets of taps so as to apply a bias voltage to the bias winding, means for rendering said control winding of the three-phase magnetic amplifier responsive to the current flow through said load winding of the first mentioned magnetic amplifier, the current flow through said bias winding producing a magnetomotive force that opposes the magnetomotive force produced by the current flow through the said control winding of the three-phase magnetic amplifier, and means for controlling the output voltage of the three-phase generator in accordance with the output of the three-phase magnetic amplifier.

9. In a regulator system which controls the output of a generator supplying energy to a polyphase bus connected to one or more loads by a power system equipped with protective means, the combination comprising a three-phase transformer having a primary winding and a secondary winding, said primary winding being connected to said bus, first means connected to two of the phases of said primary winding for providing a reference voltage, second means connected to said bus for obtaining a measure of the output voltage of two of the phases of said generator, third means for comparing said reference voltage with said measure of said output voltage to obtain an error signal which is a measure of the difference between said reference voltage and said measure of said output voltage, fourth means for amplifying said error signal and controlling the output of said generator, said secondary winding being connected to provide a supply voltage for said fourth means during normal operation of said generator, and fifth means connected in circuit relationship with said bus between the output of said generator and said secondary winding, said fifth means being connected to provide a supply voltage for said fourth means for a period long enough after a fault occurs on said power system for said protective means to clear said fault.

10. In a regulator system which controls the output of a generator supplying energy to a polyphase bus connected to one or more loads by a power system equipped with protective means, the combination comprising a transformer having a three-phase primary winding and a secondary winding, said primary winding being connected to said bus, first means connected to two of the phases of said primary winding for providing a reference voltage, second means connected to said bus for obtaining a measure of the output voltage of two of the phases of said generator, a first magnetic amplifier for comparing said reference voltage with said measure of said output voltage to obtain an error signal which is a measure of the difference between said reference voltage and said measure of said output voltage, a second magnetic amplifier for amplifying said error signal and controlling the output of said generator in accordance with said error signal, said secondary winding being connected to provide a supply voltage for said second magnetic amplifier during normal operation of said generator, and a plurality of current transformers connected in circuit relationship between the output of said generator and said secondary winding, said current transformer being connected to provide a supply voltage for said second magnetic amplifier for a period long enough after a fault occurs on said power system for said protective means to clear said fault.

References Cited in the file of this patent

UNITED STATES PATENTS

| | | |
|---|---|---|
| 2,456,938 | Harder | Dec. 21, 1948 |
| 2,524,166 | Gartner | Oct. 3, 1950 |
| 2,709,776 | Evans et al. | May 31, 1955 |
| 2,724,797 | Storm | Nov. 22, 1955 |
| 2,725,517 | Rogers | Nov. 29, 1955 |
| 2,769,133 | Franklin | Oct. 30, 1956 |